United States Patent [19]
Hoshino

[11] Patent Number: 5,074,534
[45] Date of Patent: Dec. 24, 1991

[54] SEAT WITH SPRING SUPPORTING FRAME

[75] Inventor: Akihiko Hoshino, Kanagawa, Japan

[73] Assignee: Ikeda Bussan Co., Ltd., Ayase, Japan

[21] Appl. No.: 421,052

[22] Filed: Oct. 13, 1989

[30] Foreign Application Priority Data

Mar. 30, 1989 [JP] Japan .............................. 1-37320[U]

[51] Int. Cl.⁵ ............................................ A47C 23/16
[52] U.S. Cl. ....................................... 267/144; 5/260;
267/165
[58] Field of Search ................ 267/87, 110, 111, 160,
267/165, 144; 5/247, 255, 260; 297/452, 445

[56] References Cited
U.S. PATENT DOCUMENTS

| | | | |
|---|---|---|---|
| 2,172,942 | 9/1939 | Menge | 267/110 |
| 2,175,062 | 10/1939 | Menge | 267/87 |
| 2,657,738 | 11/1953 | Kruszona | 5/260 X |
| 3,386,725 | 6/1968 | Fujikawa | 267/110 |

Primary Examiner—Robert J. Oberleitner
Attorney, Agent, or Firm—Foley & Lardner

[57] ABSTRACT

Disclosed herein is an automotive seat which includes a seat frame and a plurality of S-springs which are spanned between spaced two portions of the seat frame. Each spring has one U-shaped end portion. In order to tightly and unmovably connect the U-shaped end portion of each spring to selected one of the side portions of the frame, an improved spring holding structure is formed on the selected portion of the frame, which includes a tunnel portion which is integrally formed on the selected portion and two raised portions which are integrally formed on the same selected portion in a manner to put therebetween the tunnel portion. The distance between the two raised portions is substantially equal to the longitudinal length of the U-shaped end portion of the spring. The U-shaped end portion of the spring is received in the tunnel portion having its longitudinal ends respectively contacting with the two raised portions.

5 Claims, 2 Drawing Sheets

SEAT WITH SPRING SUPPORTING FRAME

BACKGROUND OF THE INVENTION

1. Field of the Invention

The present invention relates in general to automotive seats, and more particularly to automotive seats of a type which comprises a frame, springs supported by the frame and a cushion pad mounted on the springs.

2. Description of the Prior Art

In order to clarify the task of the present invention, one conventional automotive seat of the above-mentioned type will be described with reference to FIGS. 4 and 5 of the accompanying drawings.

In the drawings, denoted by numeral 1 is a seat frame which is rectangular in shape. The frame illustrated comprises front and rear pipes (no numerals) and an apertured rectangular panel (no numeral) welded to the pipes at front and rear portions thereof. The rectangular panel has at its rear frame portion 1a a plurality of hooks 2 and and at its front frame portion 1b a plurality of holders 3. These hooks 2 and holders 3 are used for spanning a plurality of parallel S-springs 4 between the rear and front frame portions 1a and 1b of the frame 1.

As is seen from the drawings, each holder 3 is provided by a raised part of the panel, which comprises two semicylindrical tunnel portions and a somewhat depressed roof portion 3c interposed between and integral with the tunnel portions.

As will be described hereinafter, before fixing the S-springs 4 to the frame 1, each holder 3 takes a simple configuration including a single but widened tunnel portion which is defined between two slits 3a and 3b. That is, each holder 3 is originally provided by forming the two laterally extending slits 3a and 3b in the left frame portion 1b and raising the middle portion 3cd defined between the slits 3a and 3b.

Each hook 2 is a generally U-shaped plate, which is secured at one wing to the rear frame portion 1a having the turned head portion 2b directed toward the front frame portion 1b, as is seen from FIG. 4. Designated by numeral 2a is an open portion defined between the other wing of the hook 2 and an upper surface of the rear frame portion 1a of the frame 1.

Between the holders 3 and the corresponding hooks 2, there are spanned the parallel S-springs 4. Each spring 4 has terminal end portions 4a and 4b, each extending in a direction perpendicular to the axis in which the spring 4 is extensible.

In order to mount the S-springs 4 to the frame 1, the following steps have been employed.

First, one terminal end portion 4a of each spring 4 is led into the turned head portion 2b of the corresponding hook 2 through the open portion 2a to achieve a hooked engagement with the hook 2. Then, stretching the spring 4, the other terminal end portion 4b of the spring 4 and it's neighbouring portion 4b' of the same, which thus constitute a generally U-shaped end portion of the spring 4, are thrusted into the single tunnel portion of the corresponding holder 3 from one open end to such a degree that the rounded head of the U-shaped end portion of the spring is exposed to the outside through the other open end. Then, the roof portion of the single tunnel is depressed, by a press machine, to constitute the aforementioned two semicylindrical tunnel portions through which the other terminal end portion 4b of the spring 4 and the neighbouring portion 4b' of the same are passed.

As is seen from FIG. 4, because the roof portion 3c of each holder 3 is depressed to narrow the middle portions of the open ends of the holder 3, disengagement of the U-shaped end portion of the spring 4 from the holder 3 is suppressed.

However, due to its inherent construction, the above-mentioned conventional seat has the following drawbacks.

First, because each holder 3 has the above-mentioned construction, dislocation of the U-shaped end portion of the spring 4 relative to the holder 3 tends to occur particularly at the time when the roof portion of the holder 3 is being depressed. Such displacement may also occur when the seat is subjected to a severe vibration. As is seen from FIG. 4, once such displacement occurs, parallel arrangement of the S-springs 4 on the frame 1 is broken and thus in this case, even supporting of the cushion pad by the springs 4 is not obtained. In fact, the holder 3 employed in the conventional seat has no stopper means for suppressing the displacement of the U-shaped end portion in the direction of the axis of the front frame portion 1b.

Second, when an abnormally large stress is suddenly applied to the middle portions of the springs 4, deformation of the front frame portion 1b tends to occur. In fact, such a large stress is generated when a mischievous boy jumps up and down on the seat.

SUMMARY OF THE INVENTION

It is therefore an object of the present invention to provide an automotive seat of the above-mentioned type, which is free of the above-mentioned drawbacks.

According to the present invention, there is provided an automotive seat of the above-mentioned type, which has a so-called stopper means by which the undesired displacement of the U-shaped end portion of each spring is suppressed.

According to the present invention, there is provided an automotive seat of the above-mentioned type, which has a reinforcing structure by which the undesired deformation of the frame portion is suppressed.

According to the present invention, there is provided a seat which comprises a seat frame having first and second spaced portions; a plurality of springs spanned between the first and second portions, each spring having a first terminal end portion which extends perpendicular to a direction in which the spring is extensible and a second terminal end portion which has a generally U-shaped structure; a first structure for detachably connecting the first terminal end portion of each spring to the first portion; and a second structure for detachably connecting the second terminal end portion to the second portion, wherein the second structure includes: a holder integrally formed on the second portion, the holder including a tunnel portion whose interior extends along the axis of the second portion; and two raised portions integrally formed on the second portion in a manner to put therebetween the holder, the distance between the two raised portions being substantially equal to the length of the second terminal end portion, the second terminal end portion of each spring being received in the tunnel portion of the holder having longitudinal ends thereof respectively contacting with the two raised portions.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
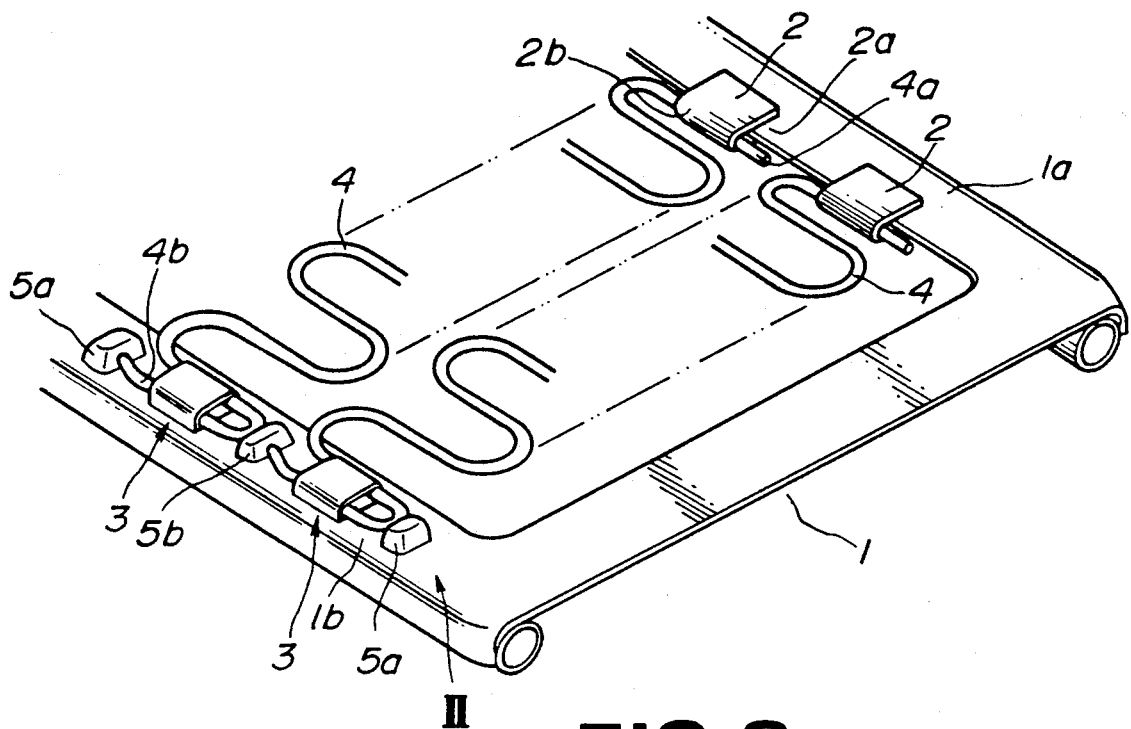
FIG. 1 is a perspective, partial, view of a seat frame employed in an automotive seat according to the present invention.
Figure 2:
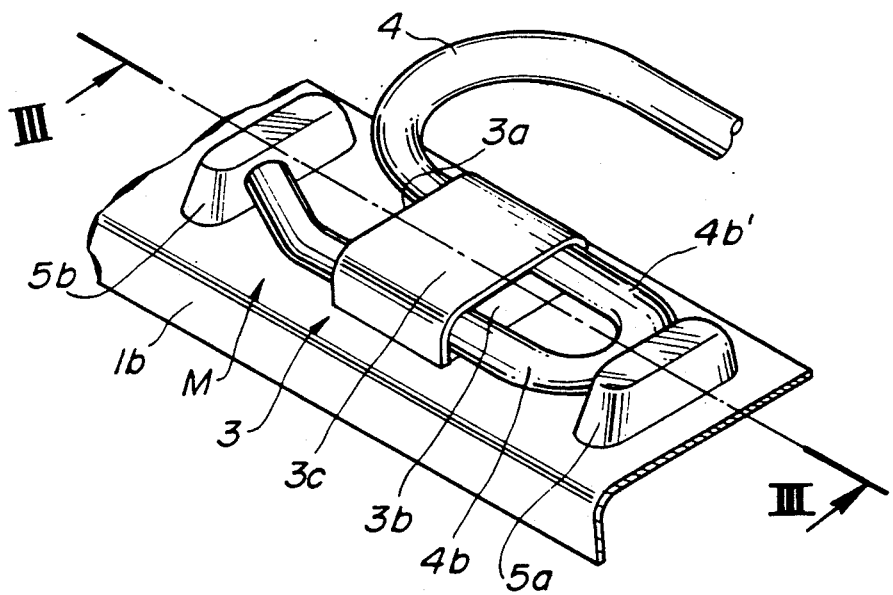
FIG. 2 is an enlarged perspective view of the portion indicated by the arrow II of FIG. 1.
Figure 3:
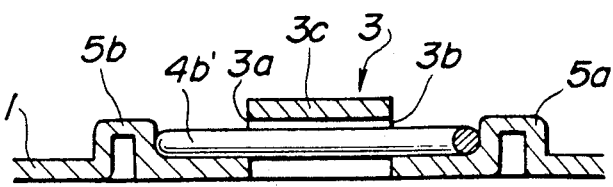
FIG. 3 is a sectional view taken along the line III—III of FIG. 2.
Figure 4:
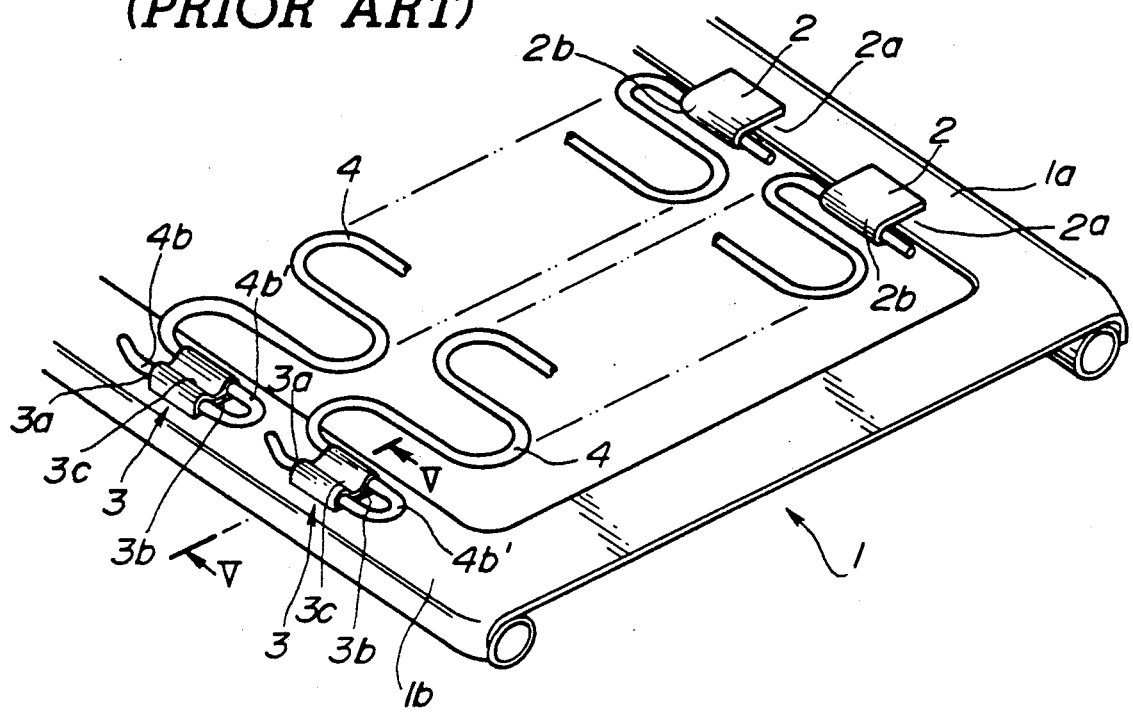
FIG. 4 is a view similar to FIG. 1, but showing a seat frame one conventional automotive seat.
Figure 5:
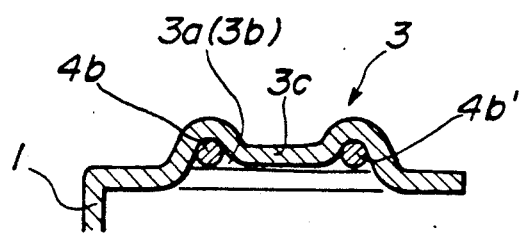
FIG. 5 is a sectional view taken along the line V—V of FIG. 4.

Referring to FIGS. 1 to 3, there is shown a seat frame employed in an automotive seat according to the present invention.

Because the seat of the invention is similar in construction to the above-mentioned conventional seat, the following explanation on the invention will be directed to only members and portions which are different from those of the conventional one.

That is, in accordance with the invention, besides the holders 3, spring stoppers 5a, 5b, 5a, . . . 5a are also employed As will become apparent as the description proceeds, the spring stoppers 5a, 5b, 5a, . . . 5a have also a function to increase the mechanical strength of the frame 1.

As is seen from FIGS. 1 and 2, each holder 3 employed in the invention takes a simple configuration, which comprises a single but widened tunnel portion which is defined between the two slits 3a and 3b. It is to be noted that the roof portion 3c of the tunnel portion is substantially flat. That is, in the invention, there is no need of depressing the roof portion 3c for holding the U-shaped end portion of each S-spring 4, as will be understood hereinafter.

As is seen from FIG. 1, a plurality of laterally extending raised portions 5a, 5b, 5a, . . . 5a are formed on the front frame portion at equally spaced intervals. As shown, every adjacent two 5a and 5b of the raised portions are arranged to put therebetween one holder 3. It is to be noted that the distance between the adjacent two 5a and 5b of the raised portions is substantially equal to the length of the U-shaped end portion of the spring 4.

It is to be noted that the holders 3 and the raised portions 5a, 5b, 5a, . . . 5a on the front frame portion 1b of the frame 1 are easily provided by using a known press machine.

In the following, the steps for mounting the S-springs 4 to the frame 1 will be described.

First, similar to the case of the above-mentioned conventional seat, one terminal end portion 4a of each spring 4 is brought into engagement with the hook 2. Then, stretching the spring 4, the U-shaped end portion of the spring 4 (which consists of the the other terminal end portion 4b of the spring 4 and its neighbouring portion 4b' of the same) is thrusted into the widened tunnel portion of the corresponding holder 3 from one open end 3a to such a degree that the rounded head of the U-shaped end portion of the spring 4 is exposed to the outside through the other open end 3b. This thrusting is carried out resiliently pressing U-shaped end portion against the raised portion 5b (see FIG. 2). The thrusting is continued until the turned head of the U-shaped end portion contacts the raised portion 5a (see FIG. 2).

Upon this being done, the U-shaped end portion of the spring 4 is tightly and unmovably held by both the holder 3 and the corresponding raised portions 5a and 5b. That is, under this condition, the displacement of the U-shaped end portion of the spring 4 in both the direction perpendicular to a major surface of the front frame portion 1b and the direction parallel with the axis of each raised portion 5a or 5b is suppressed by the holder 3, and the displacement of the U-shaped end portion along the axis of the front frame portion 1b is suppressed by the two raised portions 5a and 5b.

It is to be noted that the laterally extending raised portions 5a, 5b, 5a, . . . 5a contribute to increase in mechanical strength of the frame 1. That is, even if a big stress is applied to the springs 4 causing the U-shaped end portion of the spring to produce a considerable moment M as shown in FIG. 2, the undesired deformation of the front frame portion 1b is suppressed because of the increased strength of the same originating from the provision of the raised portions 5a, 5b, 5a, . . . 5a.

Although not shown in the drawings, for increased mechanical strength, the rear frame portion 1a of the frame 1 may also have raised portions corresponding to the above-mentioned raised portions 5a, 5b, 5a, . . . 5a on the front frame portion 1b.

What is claimed is:

1. A seat comprising:
a seat frame having first and second spaced portions;
a plurality of springs spanning said first and second portions, each spring having a first terminal end portion which extends perpendicularly to the direction in which the spring is extensible and a second terminal end portion having a generally U-shaped structure and also extending perpendicularly to the direction in which the spring is extensible;
a first structure for detachably connecting the first terminal end portion of each spring to said first portion; and
a second structure for detachably connecting the second terminal end portion to said second portion, wherein said second structure includes:
a holder integrally formed on said second portion, said holder forming a tunnel portion whose interior extends along the axis of said second portion for accommodating both legs of the U-shaped terminal end portion; and
two raised portions integrally formed on said second portion with the holder therebetween, the distance between said two raised portions being substantially equal to the length of said second terminal end portions; wherein
said second terminal end portion of each spring is received in said tunnel portion of the holder having longitudinal ends thereof respectively contacting said two raised portions.

2. A seat as claimed in claim 1, in which each of said raised portions extends in a direction perpendicular to the axis of said second portion of the seat frame.

3. A seat as claimed in claim 2, in which a roof portion of the tunnel portion of said holder is substantially flat.

4. A seat as claimed in claim 3, in which said second terminal end portion of each spring extends perpendicularly to the direction in which the spring is extensible.

5. A seat as claimed in claim 4, in which said holder and said raised portions are formed by stamping said seat frame which is constructed of a metal plate.

* * * * *